(12) United States Patent
Fowe et al.

(10) Patent No.: US 12,259,255 B2
(45) Date of Patent: Mar. 25, 2025

(54) DETECTING AND OBTAINING LANE LEVEL INSIGHT IN UNPLANNED INCIDENTS

(71) Applicant: HERE Global B.V., Eindhoven (NL)

(72) Inventors: James Adeyemi Fowe, Chicago, IL (US); Bruce Bernhardt, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 271 days.

(21) Appl. No.: 17/565,244

(22) Filed: Dec. 29, 2021

(65) Prior Publication Data

US 2023/0204376 A1    Jun. 29, 2023

(51) Int. Cl.
| | | |
|---|---|---|
| *G01C 21/36* | (2006.01) | |
| *G01C 21/30* | (2006.01) | |
| *G06F 16/28* | (2019.01) | |
| *G06F 16/29* | (2019.01) | |
| *G08G 1/01* | (2006.01) | |
| *G08G 1/052* | (2006.01) | |

(52) U.S. Cl.
CPC ......... *G01C 21/3691* (2013.01); *G01C 21/30* (2013.01); *G06F 16/285* (2019.01); *G06F 16/29* (2019.01); *G08G 1/0112* (2013.01); *G08G 1/0129* (2013.01); *G08G 1/052* (2013.01)

(58) Field of Classification Search
None
See application file for complete search history.

(56) References Cited

U.S. PATENT DOCUMENTS

| | | | | |
|---|---|---|---|---|
| 9,349,285 | B1* | 5/2016 | Fowe | G08G 1/096827 |
| 9,659,491 | B2* | 5/2017 | Fowe | G08G 1/0141 |
| 10,445,610 | B2* | 10/2019 | Fowe | G06F 18/23 |
| 2007/0005230 | A1* | 1/2007 | Sera | G08G 1/096716 |
| | | | | 701/117 |
| 2013/0282264 | A1* | 10/2013 | Bastiaensen | G08G 1/0145 |
| | | | | 701/119 |
| 2015/0127244 | A1* | 5/2015 | Fowe | G08G 1/0141 |
| | | | | 701/117 |

(Continued)

OTHER PUBLICATIONS

Terroso-Saenz et al, "A Cooperative Approach to Traffic Congestion Detection With Complex Event Processing and VANET", 2012, IEEE (Year: 2012).*

(Continued)

*Primary Examiner* — Hussein Elchanti
*Assistant Examiner* — Kenneth M Dunne
(74) *Attorney, Agent, or Firm* — Lempia Summerfield Katz LLC

(57) ABSTRACT

System and methods for detecting and obtaining lane level insight in unplanned incidents. Probe-based vehicles and lane-level insight using a lane-level map-matcher are used to acquire information. This information is aggregated and used to differentiate lane activity in terms of traffic and safe navigation. With the identification of probes per-lane and probe speeds per-lane, sudden reductions in probe speeds may be obtained at a lane-based level. This is used to verify or detect lane-level incident or hazard warnings and consequently alert a driver to safer navigation paths ahead of time, for example alerting the driver to maneuver to a different lane or to take an alternative route.

15 Claims, 12 Drawing Sheets

(56) References Cited

U.S. PATENT DOCUMENTS

| | | | | |
|---|---|---|---|---|
| 2015/0206426 A1* | 7/2015 | Bradley | ............... | G08G 1/0141 701/118 |
| 2015/0262477 A1* | 9/2015 | Fowe | ............... | G08G 1/096716 701/118 |
| 2015/0262480 A1* | 9/2015 | Fowe | ................ | G01C 21/3492 701/117 |
| 2015/0312327 A1* | 10/2015 | Fowe | ............... | G08G 1/096716 701/426 |
| 2016/0104376 A1* | 4/2016 | Fowe | .................. | G08G 1/0141 701/119 |
| 2018/0033296 A1* | 2/2018 | Fowe | ................. | G01C 21/3691 |
| 2018/0158325 A1* | 6/2018 | Bernhardt | ............ | G08G 1/0129 |
| 2018/0158326 A1* | 6/2018 | Fowe | .................. | G08G 1/0112 |
| 2018/0174443 A1 | 6/2018 | Fowe et al. | | |
| 2018/0182238 A1* | 6/2018 | Fowe | ................... | G08G 1/0112 |
| 2018/0374346 A1* | 12/2018 | Fowe | .................. | G08G 1/0129 |
| 2019/0213874 A1* | 7/2019 | Fowe | .................. | G08G 1/0141 |
| 2019/0347930 A1 | 11/2019 | Fowe et al. | | |
| 2020/0143671 A1 | 5/2020 | Fowe | | |
| 2020/0208992 A1* | 7/2020 | Fowe | ................. | G01C 21/3811 |
| 2020/0286372 A1 | 9/2020 | Fowe | | |
| 2020/0292338 A1* | 9/2020 | Fowe | ................... | G08G 1/0141 |
| 2021/0104155 A1 | 4/2021 | Xu et al. | | |

OTHER PUBLICATIONS

Wang et al, "Visual Traffic Jam Analysis Based on Trajectory Data", 2013, IEEE (Year: 2013).*

Khairul Anuar, "Methodologies for Estimating Traffic Flow on Freeways Using Probe Vehicle Trajectory Data", 2016, Old Dominion University (Year: 2016).*

Fowe, James, "Deriving Lane-level Insight from GPS Data: Innovations for Traffic & Autonomous Driving" (2019). TREC Friday Seminar Series. 166. (pp. 1-41). https://pdxscholar.library.pdx.edu/trec_seminar/166.

* cited by examiner

DETECTING AND OBTAINING LANE LEVEL INSIGHT IN UNPLANNED INCIDENTS

FIELD

The following disclosure relates to navigation devices or services.

BACKGROUND

Navigation and mapping service providers are challenged to provide digital maps of increasing levels of granularity to support advanced applications and safe operation of vehicles. For example, providing users up-to-date data on unplanned incidents (accidents, bottlenecks, etc.) may potentially reduce congestion and improve safety. Safe autonomous operations also generally require the map data to provide at least a lane-level granularity (e.g., so that navigation systems can generate lane-level routing). However, navigation service providers often only report real-time static incidents on a specific road segment, that quickly become out of date in terms of time and/or location relative to dynamic traffic events. In addition, navigation service providers face significant technical challenges to provide lane-level map data due to, for instance, the resources needed to collect lane-level data, and/or location sensor accuracy limitations and errors traditionally used to generate digital map data.

Obtaining up-to-date or real-time data on traffic flow and lane-level incidents is particularly challenging. For example, it is critical to be aware of these events in under five or ten minutes, and ideally even faster so that navigation service providers can generate safe and accurate lane-level routing and/or re-routing. Identifying an event that is immediately upcoming provides less benefit if a vehicle needs to reroute or change lanes. Traditional traffic service providers can report real-time static incidents on a specific road segment and send, if appropriate, warning messages to drivers driving upstream ahead of incidents based on multiple input resources (e.g., local or community resources, service providers, regulators, etc.). However, this information can quickly become out of date and/or stale with respect to dynamic events (i.e., the reported time and/or location of the event may quickly become inapplicable or inaccurate). In such cases, users of a navigation service that rely on problematic data can suffer from unexpected delays, reroutes, etc. As a result, users may gradually lose their trust in the service if such events occur frequently. To minimize this risk, navigation service providers have traditionally deployed human resources to monitor closures from multiple sources and to report incidents accurately. However, human or manual monitoring and verification can be resource intensive and may not scale well. For example, as the number of dangerous slowdown incidents increase (e.g., with increased coverage area), so does the labor cost and chances for human errors. Accordingly, navigation service providers face significant technical challenges to detect lane-level events in real-time.

SUMMARY

In an embodiment, a method is provided for detecting and obtaining lane-level insight in unplanned incidents. The method includes acquiring, from a plurality of probe vehicles, probe data for a road strand comprising one or more lanes; map matching, using a lane level map matcher, the probe data; generating, using a clustering algorithm and the map matched probe data, one or more clusters of vehicles comprising one or more probe vehicles on a same lane of the one or more lanes within a threshold distance of other probe vehicles in a respective cluster; determining an average speed for each cluster of the one or more clusters; and identifying unplanned incident locations based on differences in average speeds between contiguous clusters of the one or more clusters.

In an embodiment, an intelligent transportation system is provided for detecting and obtaining lane-level insight in unplanned incidents. The System includes one or more probe devices, a geographic database, and a mapping server. The one or more probe devices are configured to acquire probe data for a road strand comprising one or more lane. The geographic database is configured to store map data relating to the road strand. The mapping server is configured to map match, using a lane level map matcher and the map data, the probe data, generate, using a clustering algorithm and the map matched probe data, one or more clusters of vehicles comprising one or more probe vehicles on a same lane of the one or more lanes within a threshold distance of other probe vehicles in a respective cluster, determine an average speed for each cluster of the one or more clusters, and identify unplanned incident locations based on differences in average speeds between contiguous clusters of the one or more clusters.

In an embodiment, an apparatus is provided including at least one processor and at least one memory including computer program code for one or more programs. The at least one memory is configured to store the computer program code configured to, with the at least one processor, cause the at least one processor to: acquire, from a plurality of probe vehicles, probe data for a road strand comprising one or more lanes; map match, using a lane level map matcher, the probe data; generate, using a clustering algorithm and the map matched probe data, one or more clusters of vehicles comprising one or more probe vehicles on a same lane of the one or more lanes within a threshold distance of other probe vehicles in a respective cluster; determine an average speed for each cluster of the one or more clusters; and identify one or more unplanned incident locations based on differences in average speeds between contiguous clusters of the one or more clusters.

BRIEF DESCRIPTION OF THE DRAWINGS

Exemplary embodiments of the present invention are described herein with reference to the following drawings.

DETAILED DESCRIPTION

Figure 1:
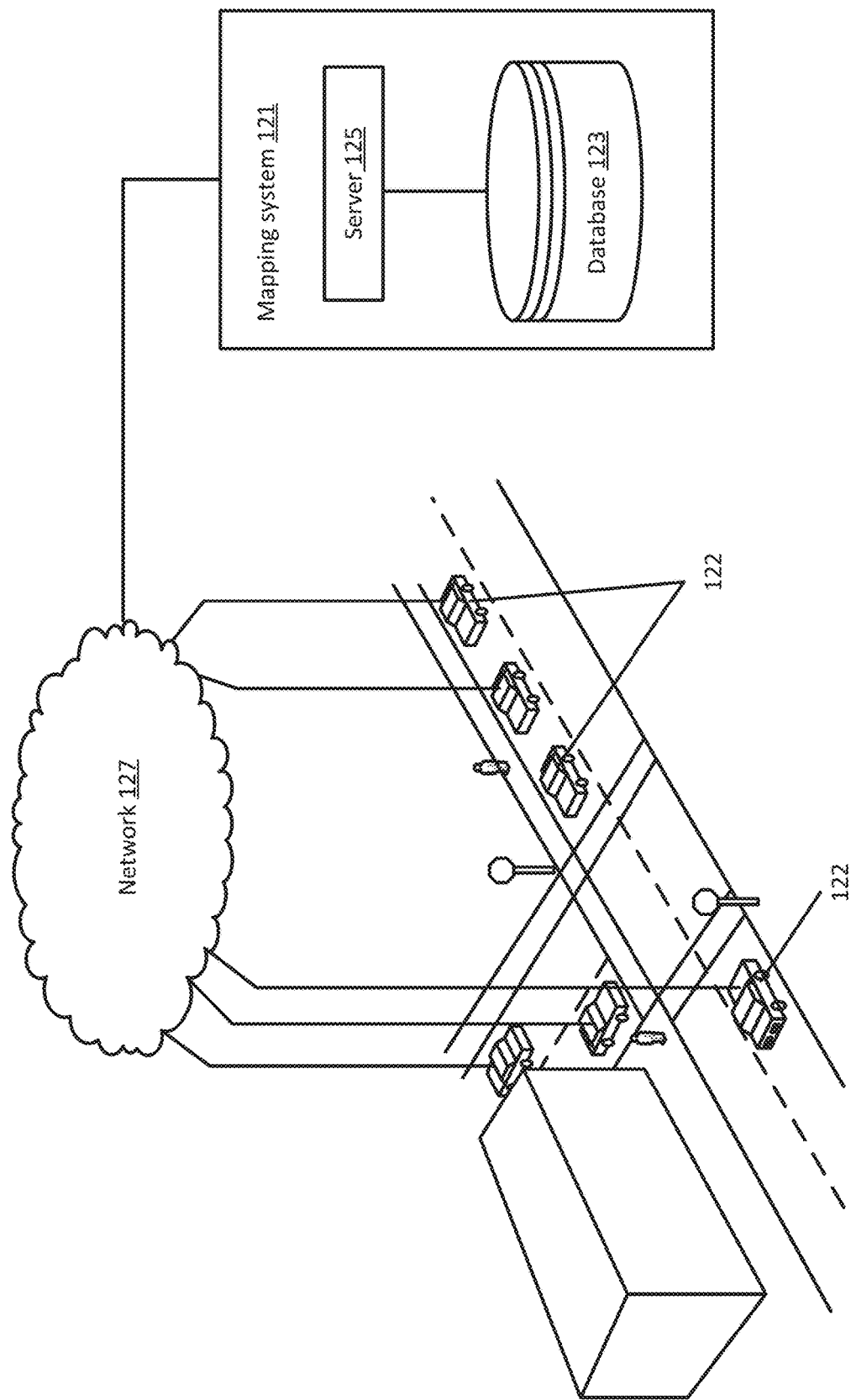
FIG. 1 depicts an example system for detecting and obtaining lane level insight in unplanned incidents according to an embodiment.

Embodiments described herein relate to intelligent transportation systems (ITS) technology and Advanced Traveler Information systems (ATIS) in which sudden unplanned incidents occur and need to be communicated in real-time. While there are several systems that already try to solve this problem by providing information on road hazards in ATIS, most of them are not able to specify which lane on the road this incident is occurring and how to do lane-level navigation around the incident. In addition, there are delays in both ITS and ATIS that prevent and hamper real-time reporting. Embodiments provide systems and methods that take a wholistic look at a stretch of road or a strand and identify the specific area and lane on the road in which accident impacts traffic. Tracking individual vehicle trajectories and detecting sudden slowdowns can help to identify the emergence of incidence on a lane. In addition, embodiments provide spatial analysis to identify the impact on traffic.

Intelligent traffic systems perform analysis on probe reports and other data in order to provide safe and accurate routing solutions for the movement of people, goods, and vehicles. Accurate routing capabilities may be based on enterprise-grade maps and location data and can adapt routes to real-world circumstances in real-time. These intelligent traffic systems can provide accurate estimated time of arrivals (ETAs) that take into account real-time congestion and incidents. One problem with ITS And ATIS systems is that navigation systems need insights on incidents well ahead of the vehicle and this includes knowing how to do lane navigation around the incident downstream. How to know which are the faster moving lanes and the slower ones and how to know which lane(s) are closed, etc. Two key components for traffic insight are timeliness and accuracy. For timeliness, faster identification and reporting is almost always more beneficial. For example, if there is an incident on a roadway, the navigation application or service that identifies and quantifies the effects of the incident fastest will provide the most benefit to its users. The first group of vehicles that are rerouted, change lanes, or informed gain the most benefit. As more vehicles are rerouted, the benefit decreases until, in theory, the system reaches an equilibrium. Similarly, accuracy in identifying and quantifying the effect is also important. The better understanding that a traffic system has concerning the incident, the best routing decisions it can provide. Correctly identifying a slowdown as a temporary slowdown instead of an accident or vice versa allows the traffic system to properly calculate routes and ETAs for vehicles that are approaching the location of the slowdown. Both timeliness and accuracy further assist the traffic system in generating predictions and insights further out from the current time period. The ability to quickly and accuracy assess incidents on the roadway, however, is hampered by a lack of granularity in the analysis of received traffic data. It is difficult for current traffic systems to identify and understand traffic flow patterns and incidents with the current reporting mechanisms.

Embodiments solve these problems and others by using probe-based vehicles and lane-level insight using a lane-level map-matcher. This information is aggregated and used to differentiate lane activity in terms of traffic and safe navigation. With the identification of probes per-lane and probe speeds per-lane, sudden reductions in probe speeds may be obtained at a lane-based level. This is used to verify or detect lane-level incident or hazard warnings and consequently alert a driver to safer navigation paths ahead of time, like maneuver to a different lane or to take an alternative route.

The following embodiments relate to several technological fields including but not limited to navigation, traffic applications, and other location-based systems. The following embodiments achieve advantages in each of these technologies because an increase in the accuracy of the identification of roadway incidents improves the effectiveness, efficiency, and speed of specific application in these technologies. In each of the technologies of navigation, traffic applications, and other location-based systems, improved identification of roadway incidents improves the technical performance of the application. In addition, users of navigation, traffic applications, and other location-based systems are more willing to adopt these systems given the technological advances in roadway incident identification, tracking, and monitoring.

FIG. 1 depicts a system for detecting and obtaining lane level insight in unplanned incidents. The system includes at least one or more devices 122, a network 127, and a mapping system 121. The mapping system 121 may include a database 123 (also referred to as a geographic database 123 or map database) and a server 125. Additional, different, or fewer components may be included. In an embodiment, the one or more devices 122 acquire probe data for a roadway. The one or more devices 122 transmit the probe data to the mapping system 121 using the network 127. The server 125 map matches the probe data using a lane level map matcher, generates clusters of vehicles on each lane, and determines a speed metric for each cluster. The speed metrics for each of the clusters are compared against one another to identify certain patterns on the road strand that may indicate unplanned incidents. The unplanned incidents are stored in the geographic database 123, data for which is made accessible to the server 125 and the one or more devices 122. The server 125 and one or more devices 122 may generate warnings or adjust routing decisions based on the provided unplanned incident data.

The one or more devices 122 may include probe devices 122, probe sensors, IoT (internet of things) devices 122, or other devices 122 such as personal navigation devices 122 or connected vehicles. The device 122 may be a mobile device or a tracking device that provides samples of data for the location of a person or vehicle. The devices 122 may include mobile phones running specialized applications that collect location data as the devices 122 are carried by persons or things traveling a roadway system. The one or more devices 122 may include traditionally dumb or non-networked physical devices and everyday objects that have been embedded with one or more sensors or data collection applications and are configured to communicate over a network 127 such as the internet. The devices 122 may be configured as data sources that are configured to acquire sensor data and/or roadway feature data. These devices 122 may be remotely monitored and controlled. The devices 122 may be part of an environment in which each device 122 communicates with other related devices in the environment to automate tasks. The devices 122 may communicate sensor data to users, businesses, and, for example, the mapping system 121.

The devices 122 may also be configured to provide probe reports to the mapping system 121 while traversing a roadway network. This probe data may be referred to as historical probe data if collected in older epochs or may be referred to as real-time if collected and provided in real time (e.g., a current epoch). An epoch may be a time period used to group probe reports or traffic reports into a manageable period. The time period may relate to a time of day, day of week, or day of the year. The epoch may be related to or take into account holidays or business hours. The time epoch may have various duration such as 10 seconds, 30 seconds, 1 minute, 15 minutes, 1 hour, or another value.

The probe data includes latitude and longitude of the probe device as it traversed a geographical region. Each vehicle and/or mobile device 122 may include position circuitry such as one or more processors or circuits for generating probe data. The probe data may include location data generated by receiving Global Navigation Satellite System (GNSS) signals and comparing the GNSS signals to a clock to determine the absolute or relative position of the vehicle and/or mobile device 122. The location data may be generated using embedded sensors or other data relating to the environment of a vehicle or device 122. The location data may include a geographic location such as a longitude value and a latitude value. In addition, the probe data may include a height or altitude.

The location/position of the vehicle and/or mobile device 122 may be determined at the lane level. A lane of the roadway is a section of the roadway designed for a single line of vehicles. The lanes of a roadway are arranged in a direction perpendicular to the direction of travel on the roadway. The lanes of the roadway may be divided by one or more lines. The probe data may be filtered into different lanes using one or more of a variety of techniques. Lane level map matching involves matching locational data to a lane. Different lane level map matching techniques may be used. In an example, the probe data is collected at a high enough spatial resolution by positional circuitry (for example GPS) to distinguish between lanes of the roadway. The device 122 or mapping system 121 may identify the locations of the lanes through clustering positions of vehicles as they traverse the roadway. The number of clusters corresponds to the number of lanes, and the default lane size is centered around the lane clusters. In an embodiment, the latitude and longitude of probe data of each vehicle is compared to previously calculated lane probabilities to determine a lane position (for example using trajectories). Lane level map matching may also use stored lane positions such as the boundaries for the lanes from memory or the geographic database 123.

In another example, the lanes may be distinguished, and the probe data map matched through another type of positioning. For example, the mapping system 121 may analyze image data from a camera or distance data from a distancing system such as light detection and ranging (LiDAR). The mapping system 121 may access a fingerprint or other template to compare with the image data or the distance data. Based on the comparison, the mapping system 121 determines the lane of travel of the mobile device 122. In another example, the device 122 detects lane lines. The lane lines may be detected from the camera data or distance data. Images of the road surface may be analyzed by the device 122 to identify patterns corresponding to lane lines that mark the edges of the lanes. Similarly, distance data such as LiDAR may include the location of lane markers.

In another example, the mapping system 121 or device 122 performs triangulation to determine the lane of travel of the mobile device 122. Triangulation may involve comparison of the angle, signal strength, or other characteristics of wireless radio signals received from one or more other devices. The positioning may be based on a received signal strength indicator (RSSI) measured at the mobile device 122. The RSSI may decrease proportionally to the square of the distance from the source of the signal. The positioning technique may analyze cellular signals received from multiple towers or cells. Position may be calculated from triangulation of the cellular signals. Several positioning techniques may be specialized for indoor applications such as pseudolites (GPS-like short range beacons), ultra-sound positioning, Bluetooth Low Energy (BTLE) signals (e.g., High-Accuracy Indoor Positioning, HAIP) and WiFi-Fingerprinting. Lane level map matching may also be performed using multiple probes from a device 122, for example by tracking the trajectory of the vehicle to determine lane changes or maneuvers. The result of the lane level map matcher is lane level positions or identifiers for the probe data.

The probe data may be collected over time and include timestamps. In some examples, the probe data is collected at a predetermined time interval (e.g., every second, ever 100 milliseconds, or another interval). The probe data may also describe the speed, or velocity, of the mobile device 122. The speed may be determined from the changes of position over a time span calculated from the difference in respective timestamps. The time span may be the predetermined time interval, that is, sequential probe data may be used. In some examples, the probe data is collected in response to movement by the device 122 (i.e., the probe report's location information when the device 122 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

The one or more devices 122 may be in communication with the sensors or may directly acquire information or data about a vehicle or the roadway. In an example, the one or more devices 122 may communicate with a vehicle's engine control unit (ECU) that controls a series of actuators on an internal combustion engine to ensure optimal engine performance. The ECU data may be provided in the probe reports. Braking sensors or other sensors configured to measure vehicle dynamics may provide information for the probe reports. A headlight sensor, wiper sensor, fog light sensor, etc. may also communicate with the one or more devices 122. The one or more devices 122 may also be configured to acquire image data using one or more cameras embedded in or in communication with the one or more devices 122. The image data may be included with the probe data and may be transmitted to the mapping system 121 for storage in the geographic database 123 and processing by the server 125. The image data may include metadata, for example, attributes about an image, such as its height and width, in pixels. The metadata may describe the content of the image, the date and time of the image, etc.

The mapping system 121 is configured to acquire/receive the probe data. To communicate with the devices 122, systems or services, the mapping system 121 is connected to the network 127. The one or more devices 122 may communicate probe data/reports to the server 125 or mapping system 121 using the network 127. The mapping system 121 may receive or transmit data through the network 127. The mapping system 121 may also transmit paths, routes, or probe data through the network 127. The mapping system 121 may also be connected to an OEM cloud that may be used to provide mapping services to vehicles via the OEM cloud or directly by the mapping system 121 through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols. The devices 122 may use Vehicle-to-vehicle (V2V) communication to wirelessly exchange information about their speed, location, heading, and roadway conditions with other vehicles, devices 122, or the mapping system 121. The devices 122 may use V2V communication to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The devices 122 may use a V2V communication system such as a Vehicular ad-hoc Network (VANET).

The mapping system 121 may analyze or process the probe data by organizing the probe data into groups based on road strands. A road strand may be defined as a group of road segments. A road strand may include a sequence of similarly situated road segments. The road strand may be a compound road segment. To identify a road strand, sets of contiguous road segments are analyzed to determine whether the road segments are part of a strand should continue through the intersection. The analysis may involve identifying an angle (θ) between a pair of adjacent road segments and compare the angle to a predetermined threshold. Various examples may be used for the angle (e.g., 90, 125, or 150 degrees). When the angle is greater than the predetermined threshold, the pair of adjacent road segments are associated in the same road strand. Other factors such as intersecting road segments may also be used to identify a road strand. An angle at which two road segments meet is determined and compared to a threshold angle. When the angle between two roads in the intersection is substantially straight (e.g., the angle exceeds the threshold), the two road segments are assigned to the same road strand. When the angle between two roads in the intersection is not substantially straight (e.g., the angle is less than the threshold), the two road segments are assigned to different road strands.

Roadway strands or data used to generate them (e.g., angles, configurations, roadway types, etc.) may be stored in the geographic database 123. The geographic database 123 is configured to store and provide information to and from at least the mapping system 121, server 125, and devices 122. The geographic database 123 is configured to store strand data, lane data, probe data, and lane-level accident/hazard data.

Using the probe data, for a road strand, the mapping system 121 generates, using a lane level map matcher as described above, one or more clusters of vehicles including one or more vehicles on a same lane of the one or more lanes within a threshold distance (e.g., 10 meters, 20 meters, 30 meters, etc.) of other vehicles in a respective cluster. A clustering algorithm, for example, a K-means algorithm may be used. The mapping system 121 determines a speed metric, for example an average speed, for each cluster of the one or more clusters. The mapping system 121 identifies unplanned incident locations based on differences in the speed metric between contiguous clusters of the one or more clusters. The mapping system 121 is configured to publish or otherwise make available the identified unplanned incident locations for use by the one or more devices 122 or other interested parties. The results may assist in mapping an incident area on a strand with lane-level detail by showing sub-segments that are likely having a bottleneck or hazard and their corresponding traffic impact.

Figure 2:
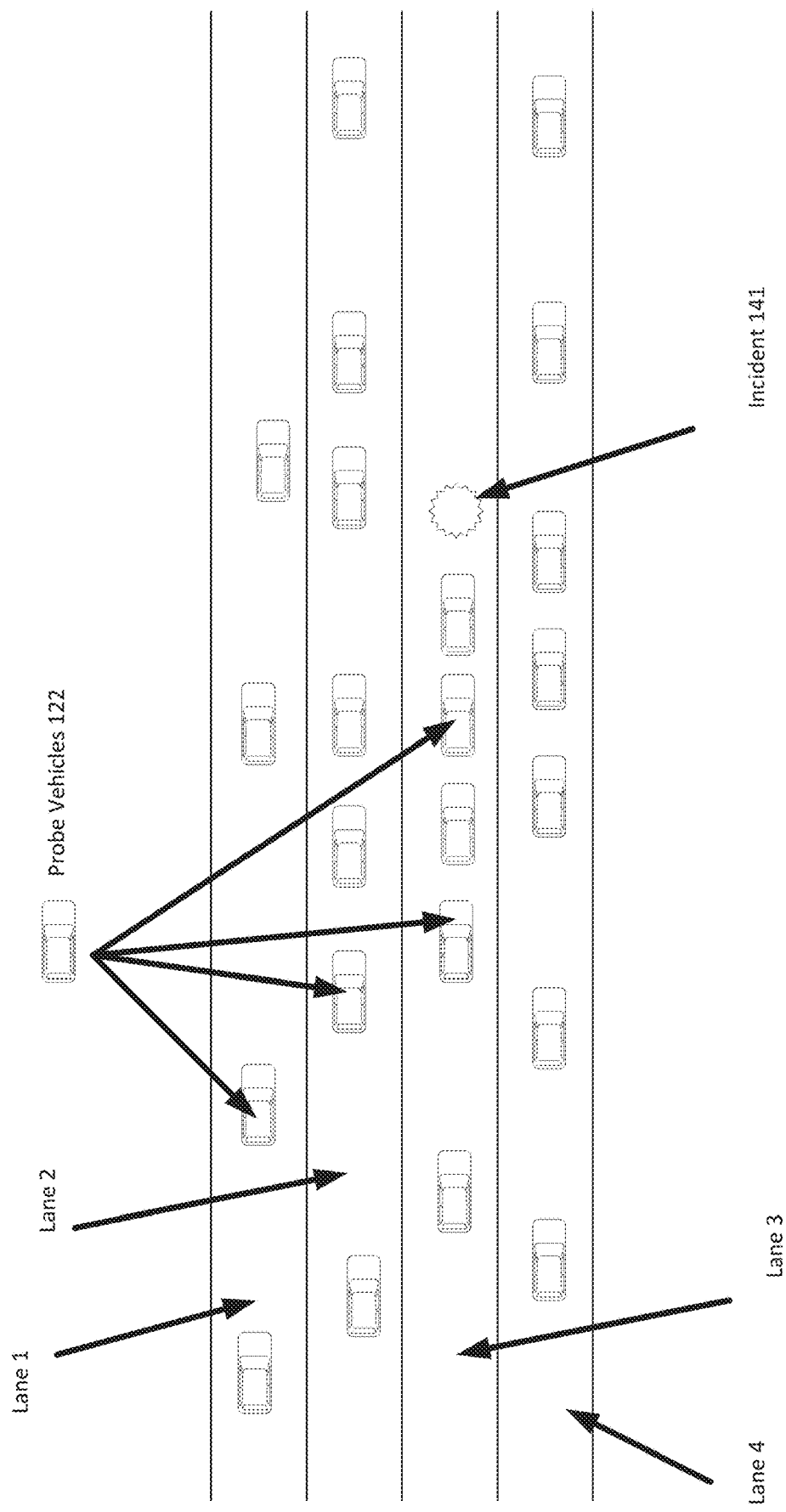
FIG. 2 depicts an example road strand and an unplanned incident.

FIG. 2 depicts an example of an unplanned incident on a road strand. The road strand has four lanes: lane 1, lane 2, lane 3, and lane 4. There are twenty-three (23) probe vehicles depicted. Every vehicle may not be a probe vehicle, but for this example, each vehicle 122 is in communication with the mapping system 121 and is configured to acquire and transmit probe data including at least longitude and latitude values. In an example, each vehicle 122/probe collects information about its position every second that it is traversing the roadway. This data may be map matched by the vehicle 122 or by the mapping system 121. FIG. 2 further depicts a location of an incident 141. The incident 141 may be, for example, a stopped vehicle, an obstruction in the roadway, a much slower truck, etc.

Figure 3:
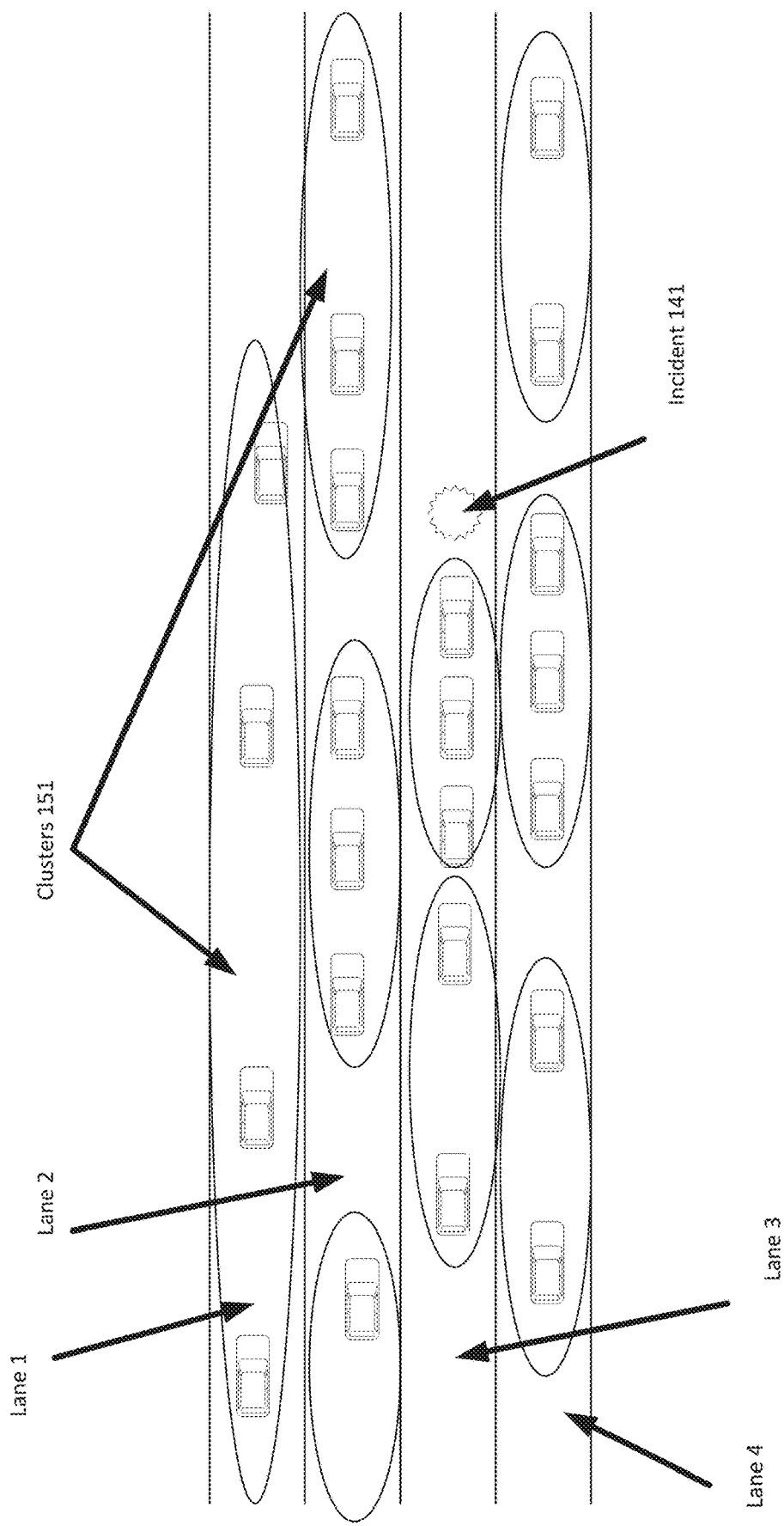
FIG. 3 depicts an example of clustering on a road strand according to an embodiment.

FIG. 3 depicts an example of clustering vehicles on the road strand of FIG. 2. The road strand includes four lanes as depicted in FIG. 2. Each of the twenty-three (23) vehicles 122 are grouped into clusters that are based at least in part on the distance of the vehicles 122. The clustering may further be based on the speed or characteristics of the vehicles 122. In an embodiment, the mapping system 121 is configured to map match the probe data at a lane level using a lane level map matcher (LLMM) in order to identify the lanes on which the vehicles 123 are operating. In an embodiment, the latitude and longitude of probe data of each vehicle is compared to previously calculated lane probabilities. This map matching technique uses a "d-value" that is the displacement value of the latitude and longitude relative to a centerline of the identified link. A layer of abstraction is created over a map of the road strand/road segment as the virtual lane speed profile to generate the lane probabilities of probe data points based on their lateral positions (d-value) relative to the link. These form the emission probabilities of a Hidden Markov Model (HMM) in which the Viterbi algorithm may be used to make inference of the most probable lane(s) of a probe trajectory. Based on the most probable lane(s), a probe trajectory including two or more probes from the same vehicle is map-matched on a lane level to a lane as the vehicle traverses the road segment.

The mapping system 121 is configured to separate each lane on the strand to lane-strands and then use a clustering algorithm to isolate the congestion area and inspect the sudden change amongst clusters along the distance of the strand. A K-means algorithm may be used. In an embodiment, the distance metric for k-means may be a composite, for example the probe's distance along the strand and its speed. After K-means clustering, the distance component in the center of each cluster is used to sort them in sequential order. The average probe speed for each cluster is obtained. Then the differences in mean-speed between contiguous clusters is used as a metric to detect incident location.

Figure 4:
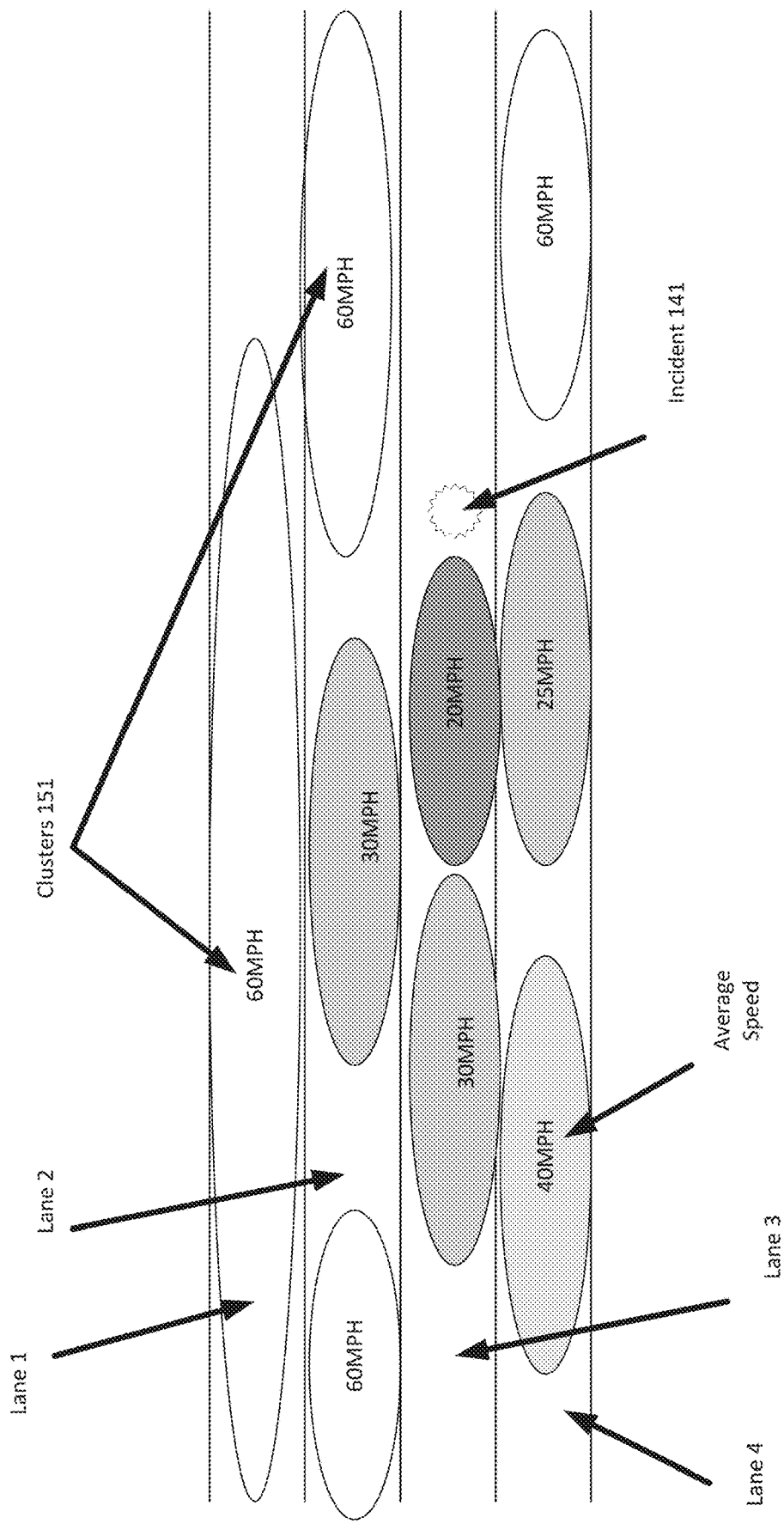
FIG. 4 depicts an example of calculated average speeds for the clusters of FIG. 3 according to an embodiment.

FIG. 4 depicts a visual example of the average road speeds for each cluster of FIG. 3. As shown in the figure above, using LLMM, we obtain the average probe speed on lanes 1, 2, 3, and 4 for each of the clusters. For example, there are four clusters with average speeds of 60 MPH and one with an average speed of 20 MPH. In a free flow clear environment, the average speed might be 60 MPH. Thus, the vehicles in Lane 1 are travelling at an expected speed assuming no obstructions or incidents. The cluster in Lane 3 right before the unplanned incident 141, however, has an average speed of 20 MPH. In addition, nearby clusters have also been slowed down prior to the incident 141. From the pattern of cluster speeds, the mapping system 121 may be able to identify and classify the incident 141 at very close to real time as the determination and identification does not require annotated reports only probe data with lat/lon coordinates.

In an embodiment, the mapping system 121 is configured to perform the following. For a road segment or strand S with N number of lanes, the mapping system 121 performs lane level map matching on the probes on S and obtains all the probes on all N lanes. Then the mapping system 121 splits, S to N lane-strands LS and runs a K-means algorithm on all LS in S with a K-value=5, distance metric (x, y) where x=distance along the strand and y=probe speed. Then the mapping system 121 uses the x-value in the center of each K clusters to sort them in sequential order. Then the mapping system 121 obtains the average speed of probes in each cluster k in K. Then the mapping system 121 obtains the speed-ratio SR for each contiguous pare of cluster using SR=(Avg.Speed of k+1)/(Avg.Speed of k). Then the mapping system 121 obtains LOS delta (LD) or change in JAM factor across K clusters using LD=JAM.Factor of k+1− JAM.Factor of k. If SR and/or LD values are greater than predefined thresholds (for example by 10%, 20%, 50%, 100%, etc.), then cluster $k^*=k$ is said to have traffic incident. The JAM factor is a ratio or probability that indicates that level of traffic flow. For example, traffic flow that flows freely may include a lower JAM factor and vice versa. In an example, the JAM factor is calculated between 0.0 and 10.0 indicating the expected quality of travel, where 0 is high quality and 10.0 is poor quality or high level of a traffic jam. Alternatively, the JAM factor may be a ratio where a higher ratio means less of a traffic jam. In an embodiment, the JAM factor is calculated as a ratio of the average speed vs the free flow speed of a segment (or the free flow speed of a segment divided by the average speed). The free-flow speed is the average speed on a lane or road where there is zero traffic congestion, for example in the middle of the night. In FIG. 4 depicted above, the free-flow speed may be 60 MPH. Certain clusters may be moving at that speed. The JAM factor for those clusters can be calculated as 60 MPH/60 MPH. Other clusters that have slowed down exhibit a higher JAM factor as their current speed is a percentage of the free flow speed.

In an embodiment, the y-value in center of $k^*$ is the point of incident occurrence and the range min(Y) to max(Y) in $k^*$ is the subsegment of the road strand. All lane strands with at least one $k^*$ are identified and may be spatially interpolated to show the full lane-level detail of the impact of the incident if any. Lane-level navigation decisions may be taken based on the average probe speeds of $k=k^*-1$ showing the impact of congestion upstream.

The server(s) 125 may be a host for a website or web service such as a mapping service and/or a navigation service. The mapping service may provide standard maps or HID maps generated from the geographic data of the database 123, and the navigation service may generate routing or other directions from the geographic data of the database 123. The mapping service may also provide information generated from attribute data included in the database 123. The server 125 may also provide historical, future, recent or current data for the links, segments, paths, or routes using historical, recent, or real-time collected data. The server 125 is configured to communicate with the devices 122 through the network 127. The server 125 is configured to receive a request from a device 122 for a route or maneuver instructions and generate one or more potential routes or instructions using data stored in the geographic database 123. The server 125 may also be configured to provide up to date information and maps to external geographic databases or mapping applications.

In an embodiment, the server 125 is configured to receive probe data from the one or more devices 122, map match the probe data, cluster the lane level map matched probe data, determine a speed metric for each cluster, and identify unplanned incidents if they exist. The server 125 may further be configured to use a model to identify or classify the unplanned incidents based on the characteristics of each cluster. The model may be a classifier that is trained using supervised learning. The classification model may classify, based on the characteristics of each cluster (for example, the speed metric or average speed values), whether or not an unplanned incident is occurring and the type of incident that is present. The classification model may include a neural network that is defined as a plurality of sequential feature units or layers. Sequential is used to indicate the general flow of output feature values from one layer to input to a next layer. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous and/or subsequent layer or unit. Skip connections may be used, such as a layer outputting to the sequentially next layer as well as other layers. Rather than pre-programming the features and trying to relate the features to attributes, the deep architecture is defined to learn the features at different levels of abstraction based on the input data. The features are learned to reconstruct lower-level features (i.e., features at a more abstract or compressed level). Each node of the unit represents a feature. Different units are provided for learning different features. Various units or layers may be used, such as convolutional, pooling (e.g., max pooling), deconvolutional, fully connected, or other types of layers. Within a unit or layer, any number of nodes is provided. For example, 100 nodes are provided. Later or subsequent units may have more, fewer, or the same number of nodes.

Unsupervised learning may be used to compute classification, based on the distribution of the samples, using methods such as k-nearest neighbor. In supervised learning, the classification step may happen in the last layer, and takes the key features of the sample as input from the previous layers. There are different classification functions, depending on the use case. An embodiment uses a Softmax function—where for each sample, the result is the probability distribution over the classes.

Different neural network configurations and workflows may be used for the network such as a convolution neural network (CNN), deep belief nets (DBN), or other deep networks. CNN learns feed-forward mapping functions while DBN learns a generative model of data. In addition, CNN uses shared weights for all local regions while DBN is a fully connected network (e.g., including different weights for all regions of a feature map. The training of CNN is entirely discriminative through backpropagation. DBN, on the other hand, employs the layer-wise unsupervised training (e.g., pre-training) followed by the discriminative refinement with backpropagation if necessary. In an embodiment, the arrangement of the trained network is a fully convolutional network (FCN). Alternative network arrangements may be used, for example, a 3D Very Deep Convolutional Networks (3D-VGGNet). VGGNet stacks many layer blocks containing narrow convolutional layers followed by max pooling layers. A 3D Deep Residual Networks (3D-ResNet) architecture may be used. A Resnet uses residual blocks and skip connections to learn residual mapping.

The training data for the model/network (and other networks) includes ground truth data or gold standard data, for example actual detected or identified incident data and characteristics of each cluster that has been verified, for example, by on the ground personal. Ground truth data and gold standard data is data that includes correct or reasonably accurate labels that are verified manually or by some other accurate method. The training data may be acquired at any point prior to inputting the training data into the network.

The server 125 may iteratively train or configure the model using a set of historical training data that includes annotated (known or identified) incidents and cluster speed data. The training data is input into the model which outputs insight into a classification/categorization of the incident. The output is compared the annotation. The comparison is used to adjust the model/network until the model is optimized. For the machine learning task described above and herein, the model (also referred to as machine learning model, neural network, or network) may be trained using one or more optimization algorithms such as gradient decent. Training using an optimization method such as gradient descent includes determining how close the model estimates the target function. The determination may be calculated a number of different ways that may be specific to the particular model being trained. The cost function involves evaluating the parameters in the model by calculating a prediction for the model for each training instance in the dataset and comparing the predictions to the actual output values and calculating an average error value (such as a value of squared residuals or SSR in the case of linear regression). In a simple example of linear regression, a line is fit to a set of points. An error function (also called a cost function) is defined that measures how good (accurate) a given line is. In an example, the function inputs the points and return an error value based on how well the line fits the data. To compute the error for a given line, in this example, each point (x, y) is iterated in the data set and the sum the square distances between each point's y value and the candidate line's y value is calculated as the error function. Gradient descent may be used to minimize the error functions. Given a function defined by a set of parameters, gradient descent starts with an initial set of parameter values and iteratively moves toward a set of parameter values that minimize the function. The iterative minimization is based on a function that takes steps in the negative direction of the function gradient. A search for minimizing parameters starts at any point and allows the gradient descent algorithm to proceed downhill on the error function towards a best outcome. Each iteration updates the parameters that yield a slightly different error than the previous iteration. A learning rate variable is defined that controls how large of a step that is taken downhill during each iteration.

Alternative optimization algorithms may be used. For example, stochastic gradient decent is a variation of gradient decent that may be used. Nesterov accelerated gradient (NAG) is another algorithm that solves a problem of momentum when an algorithm reaches the minima i.e., the lowest point on the curve. Adaptive Moment Estimation (Adam) is another method that computes adaptive learning rates for each parameter. In addition to storing an exponentially decaying average of past squared gradients like AdaDelta, Adam also keeps an exponentially decaying average of past gradients M(t), similar to momentum. Depending on the model, different types of optimization algorithms, e.g., first order or second order (hessian) may be used. Any algorithm that executes iteratively by comparing various solutions until an optimum or a satisfactory solution is found may be used to train the model. The trained model may be stored at the server 125. The trained model may be deployed to a networked cloud-based environment or to one or more devices 122.

The mapping system 121/server 125 are configured to publish or otherwise make available data relating to unplanned incidents. The server 125, for example, may provide a navigation service or application that is accessible by the one or more devices 122. The server 125 may generate warnings for the unplanned incidents or provide, for example, alternative routes based on the unplanned incidents.

Figure 5:
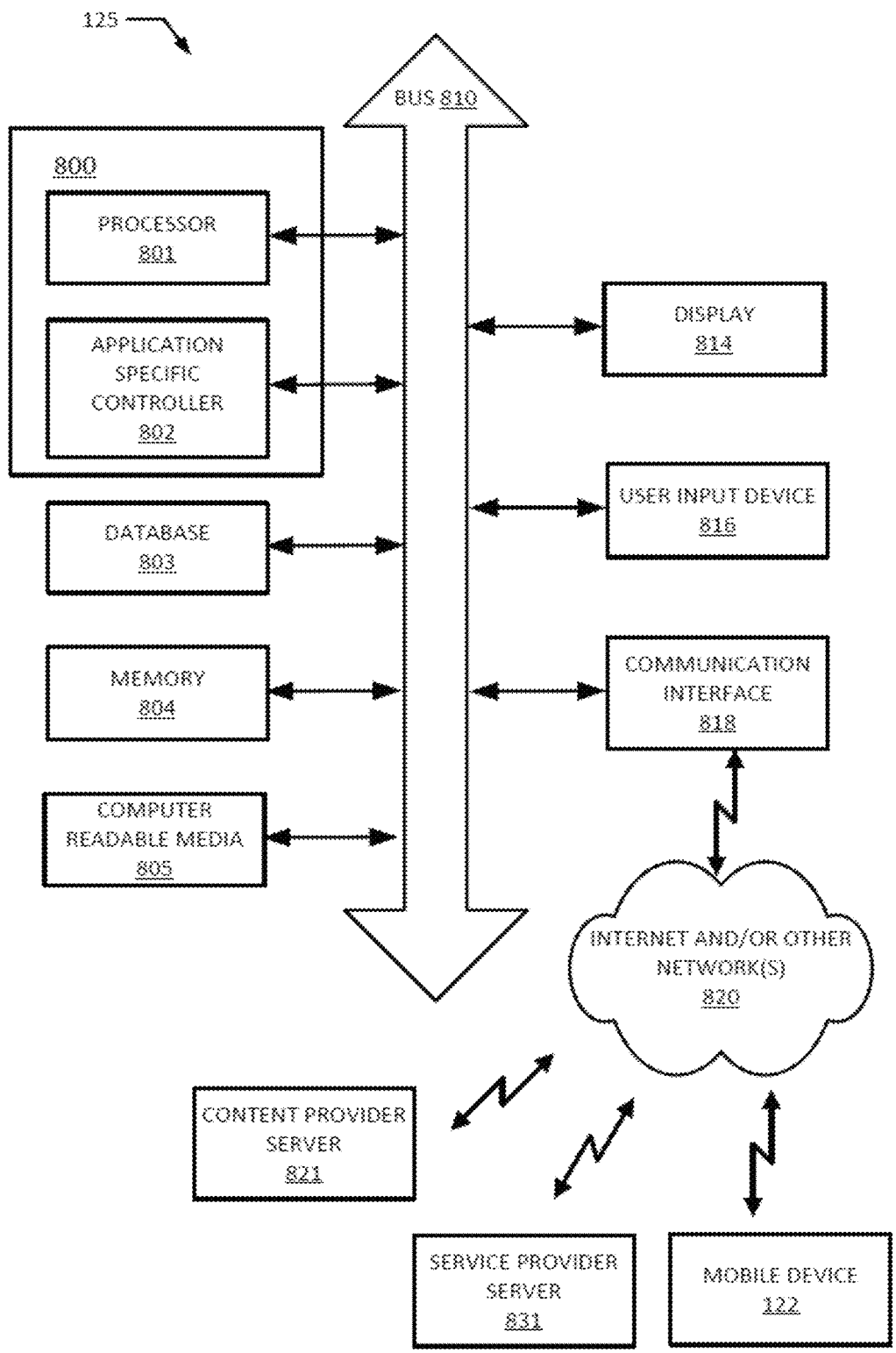
FIG. 5 depicts an example server of FIG. 1 according to an embodiment.

FIG. 5 depicts an example server 125 for the system of FIG. 1 that is configured to receive probe data and determine if an unplanned incident is present on a road strand. The server 125 may include a bus 810 that facilitates communication between a controller 800 that may be implemented by a processor 801 and/or an application specific controller 802, which may be referred to individually or collectively as the controller 800, and one or more other components including a database 803, a memory 804, a computer readable medium 805, a display 814, a user input device 816, and a communication interface 818 connected to the internet and/or other networks 820. The contents of database 803 are described with respect to database 123. The server-side database 803 may be a master database that provides data in portions to the database of the mobile device 122. Additional, different, or fewer components may be included. The memory 804 and/or the computer readable medium 805 may include a set of instructions that can be executed to cause the server 125 to perform any one or more of the methods or computer-based functions disclosed herein. The server 125 may be in communication through the network 820 with a content provider server 821 and/or a service provider server 831. The server 125 may provide mapping or navigation related services or data to the content provider server 821 and/or the service provider server 831. The content provider may include device manufacturers that provide location-based services.

The memory 804 and/or the computer readable medium 805 may include a set of instructions that can be executed to cause the server 125 to perform any one or more of the methods or computer-based functions disclosed herein. In a networked deployment, the system of FIG. 5 may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions.

The server 125 may be in communication through the network 820 with a content provider server 821 and/or a service provider server 831. The server 125 may provide the point cloud to the content provider server 821 and/or the service provider server 831.

Figure 6:
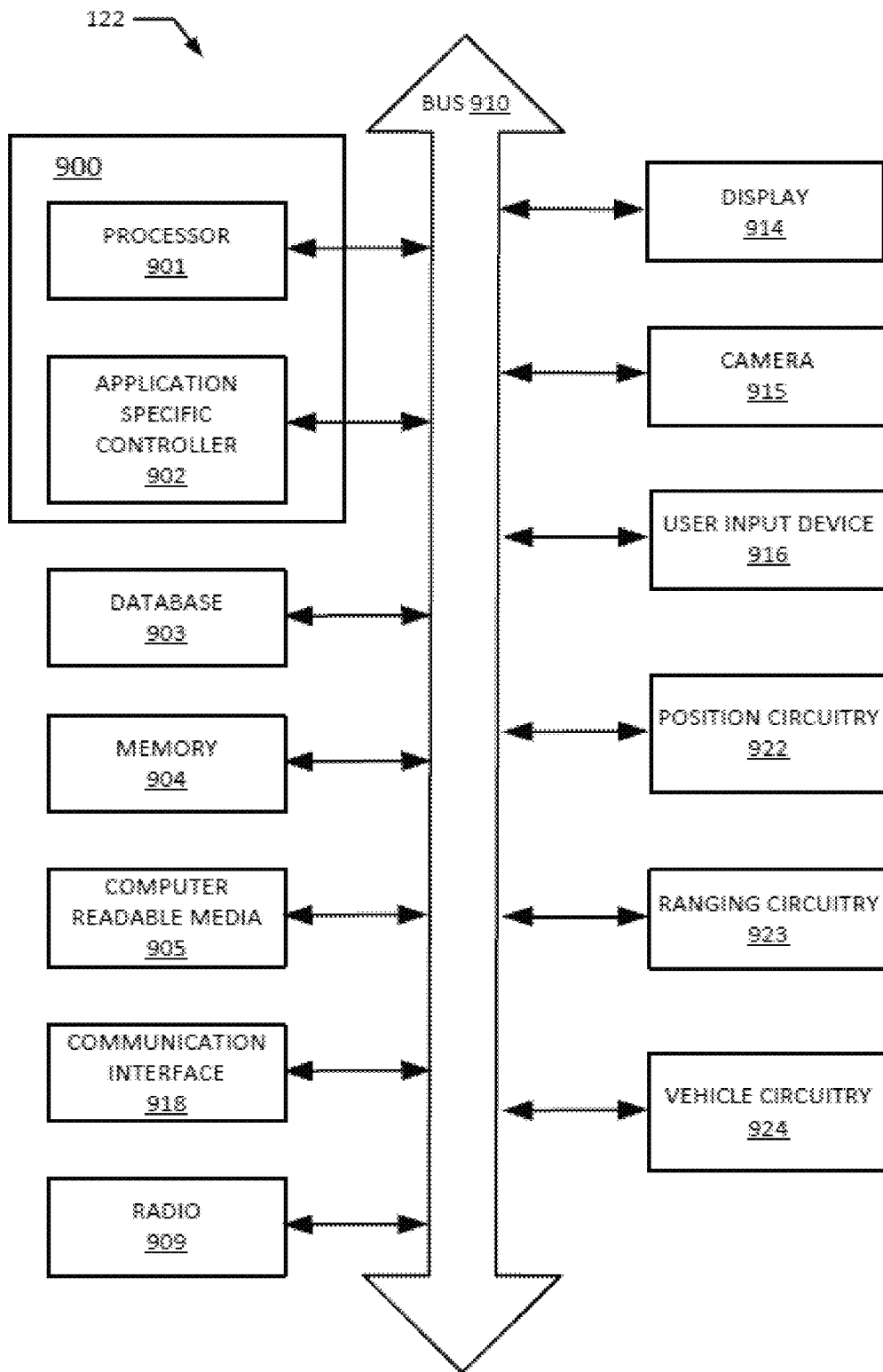
FIG. 6 depicts an example device of FIG. 1 according to an embodiment.

FIG. 6 illustrates an example mobile device 122 for the system of FIG. 1. The mobile device 122 is configured to provide historical and real-time probes for use in determining if an unplanned incident is present on a road strand. The mobile device 122 is further configured to receive event warnings from the server 125 and take appropriate actions in response. The mobile device 122 may include a bus 910 that facilitates communication between a controller 900 that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to the geographic database 123. The device-side database 903 may be a user database that receives data in portions from the database 903 of the mobile device 122. The communication interface 918 connected to the internet and/or other networks (e.g., network 127 shown in FIG. 1). The vehicle circuitry 924 may include any of the circuitry and/or devices described with respect to FIG. 6. Additional, different, or fewer components may be included.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Figure 7:
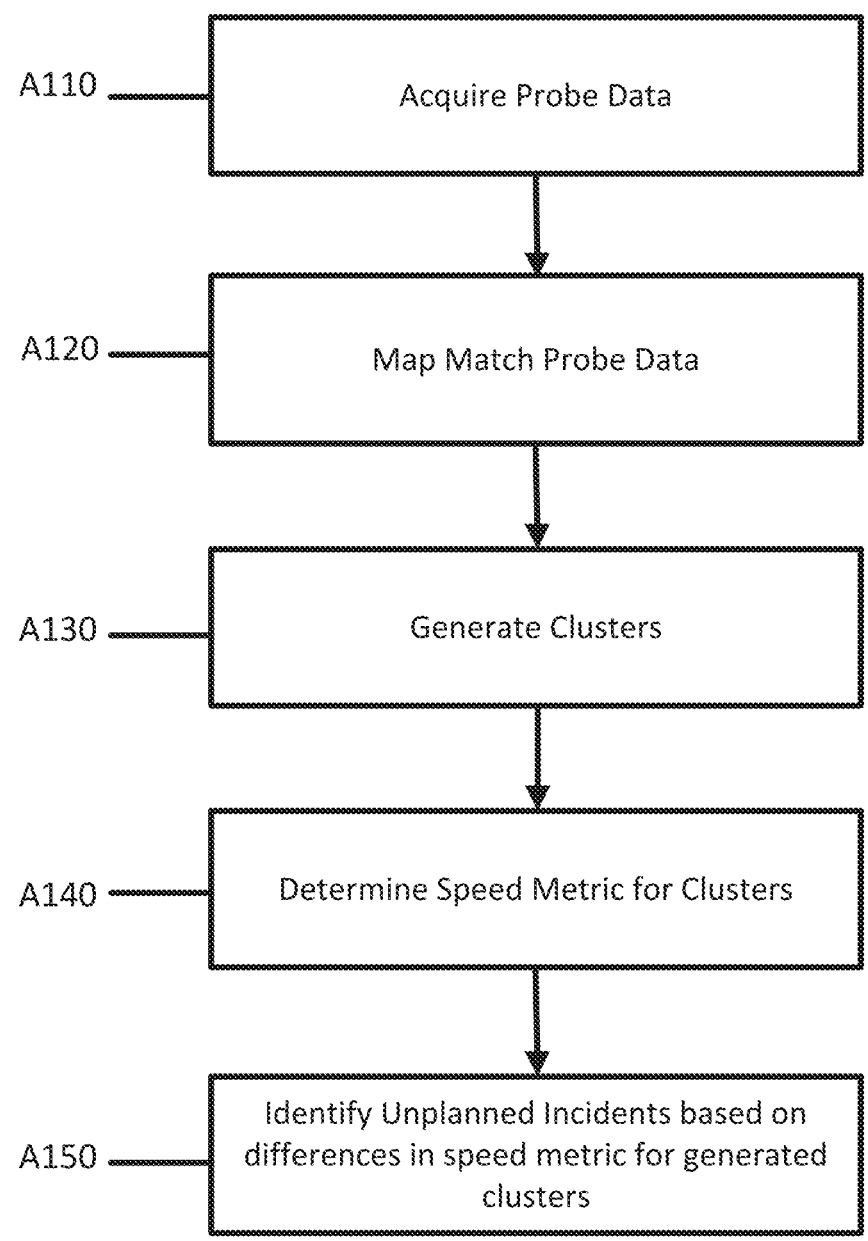
FIG. 7 depicts an example workflow for detecting and obtaining lane level insight in unplanned incidents according to an embodiment.

FIG. 7 depicts an example workflow for detecting and obtaining lane level insight in unplanned incidents using the server 125 of FIG. 5 and the device 122 of FIG. 6. As presented in the following sections, the acts may also in part be performed using any combination of the components indicated in FIG. 1, 5, or 6. For example, certain acts may be performed by the server 125, the device 122, the mapping system 121, or a combination thereof. Additional, different, or fewer acts may be provided. The acts are performed in the order shown or other orders. The acts may also be repeated. Certain acts may be skipped.

At Act A110, the server 125 identifies probe data for a roadway strand including one or more lanes. The server 125 may acquire or receive the probe data from the device 122. The device 122 is configured to determine its location using the position circuitry 922, ranging circuitry 923, vehicle circuitry 924, and the geographic database 123. The positioning circuitry 922 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 922 may also include gyroscopes, accelerometers, magnetometers, or any other device for tracking or determining movement of a mobile device 122. The gyroscope is operable to detect, recognize, or measure the current orientation, or changes in orientation, of a mobile device 122. Gyroscope orientation change detection may operate as a measure of yaw, pitch, or roll of the mobile device 122.

The device 122 may also be configured to acquire the data for the location using one or more sensors and/or the geographic database 123. The one or more sensors may include ranging circuitry 923, image/video cameras, weather sensors, occupant sensors, and any other vehicle sensor that collects data about the vehicle or the environment around the vehicle. For example, the ranging circuitry 923 may include a LIDAR system, a RADAR system, a structured light camera system, SONAR, or any device configured to detect the range or distance to objects from the mobile device 122. The controller 900 of the device 122 may also communicate with a vehicle engine control unit (ECU) that operates one or more driving mechanisms (e.g., accelerator, brakes, steering device). Alternatively, the mobile device 122 may be the vehicle ECU that operates the one or more driving mechanisms directly.

The device 122 may communicate with the server 125 to provide probe data. The communication interface 918 and/or communication interface 918 may include any operable connection. An operable connection may be one in which signals, physical communications, and/or logical communications may be sent and/or received. An operable connection may include a physical interface, an electrical interface, and/or a data interface. The communication interface 918 provides for wireless and/or wired communications in any now known or later developed format. The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol.

Figure 8:
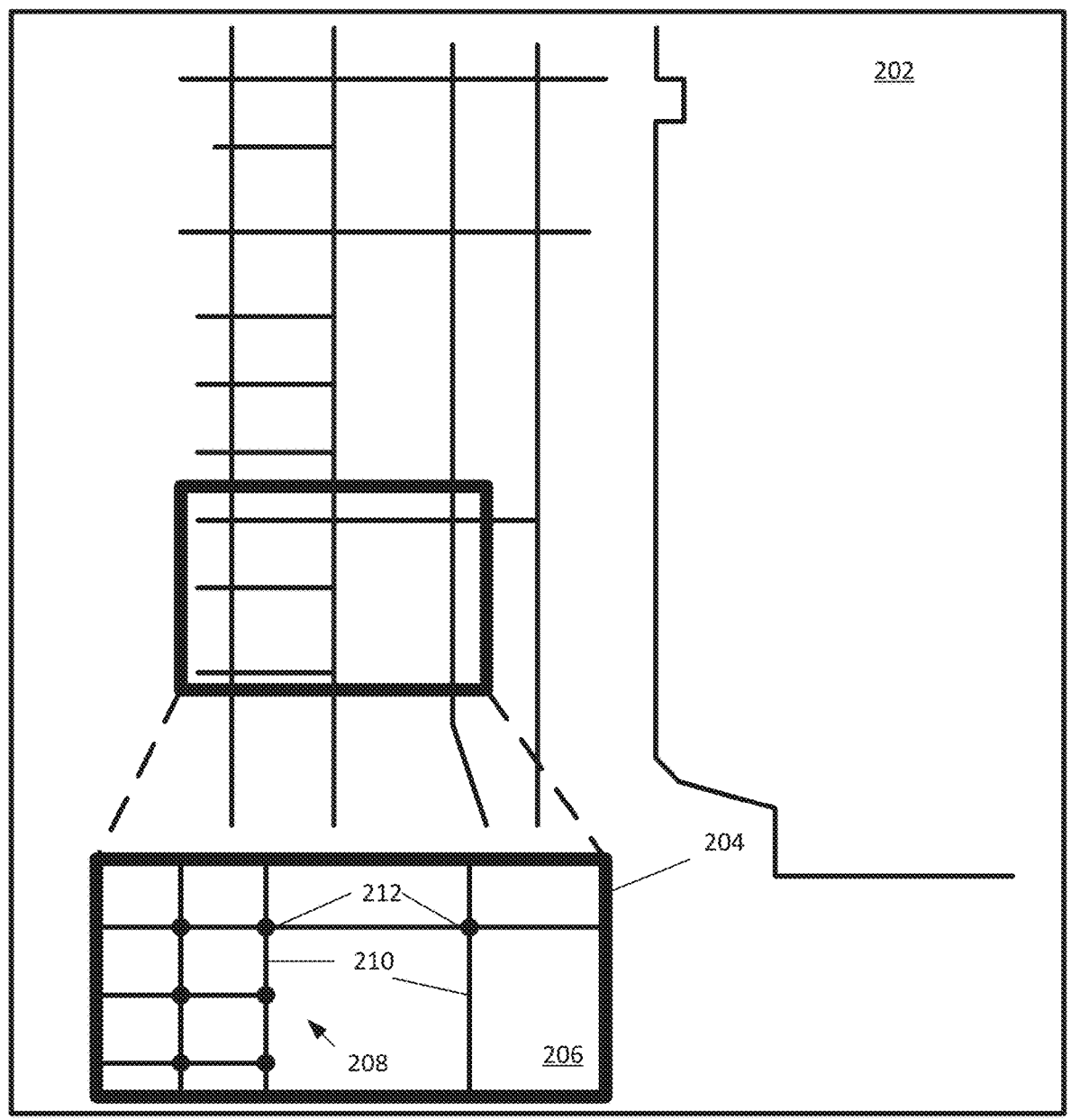
FIG. 8 depicts an example region of a geographic database.

At Act A120, the server 125 map matches the probe data to a lane strand. A land strand is similar to a road strand in that it includes one or more sections of a contiguous lane on a road strand. The probe data includes latitude and longitude of the probe as it traversed a geographical region. The geographic database 123 includes map data for the roadway, road strand, and lane strand, for example, their configuration and layout. FIG. 8 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 8 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it one or more nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 9:
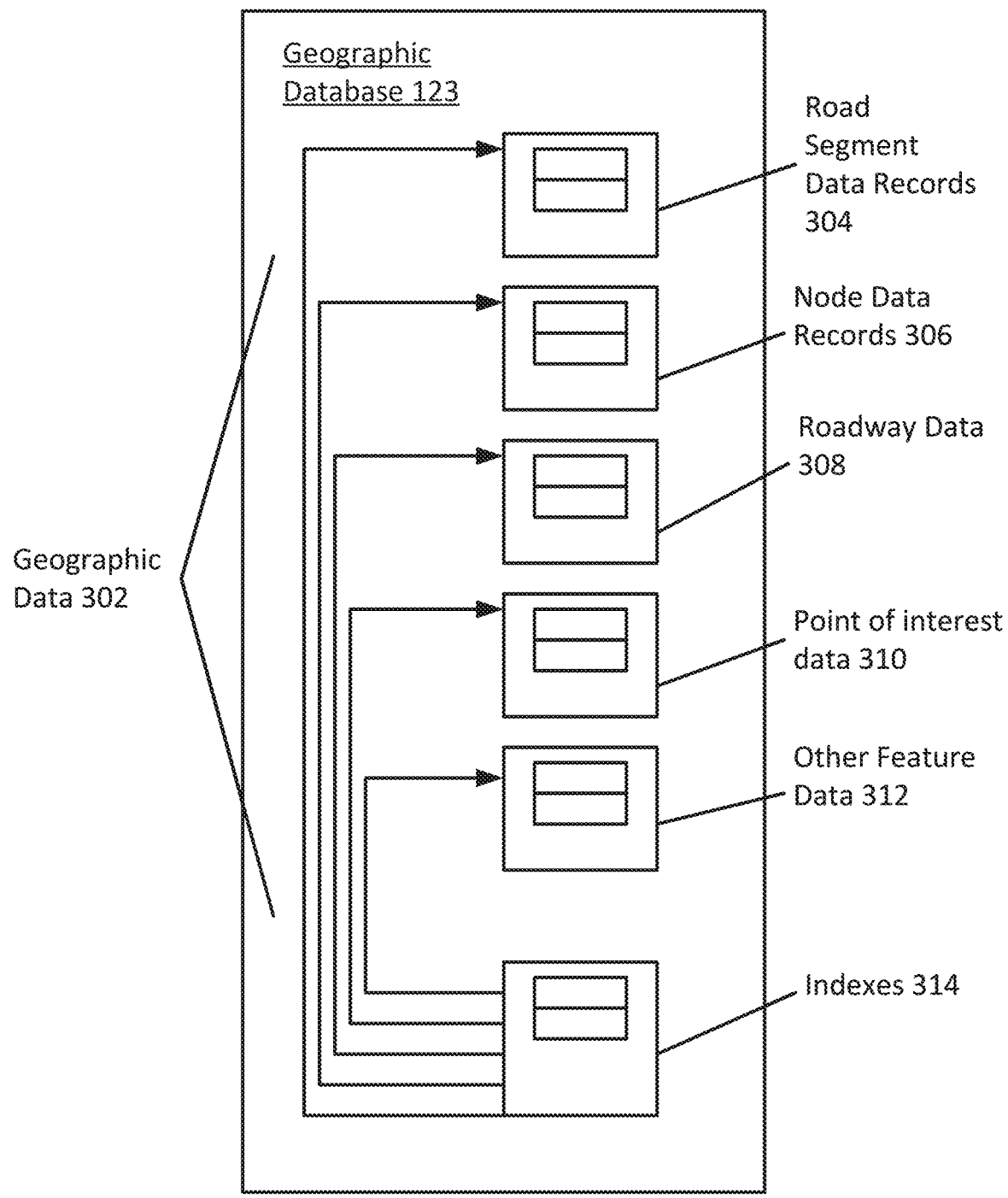
FIG. 9 depicts an example geographic database of FIG. 1.

As depicted in FIG. 9, in one embodiment, the geographic database 123 contains geographic data 302 that represents some of the geographic features in the geographic region 202 depicted in FIG. 7. The data 302 contained in the geographic database 123 may include data that represent the road network 208. In FIG. 9, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges, etc. The roadway data 308 may be further stored in sub-indices that account for different types of roads or features. The point of interest data 310 may include data or sub-indices or layers for different types of points of interest. The point of interest data may include point of interest records comprising a type (e.g., the type of point of interest, such as restaurant, fuel station, hotel, city hall, police station, historical marker, ATM, golf course, truck stop, vehicle chain-up stations, etc.), location of the point of interest, a phone number, hours of operation, etc. The feature data 312 may include other roadway features.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

Figure 10:
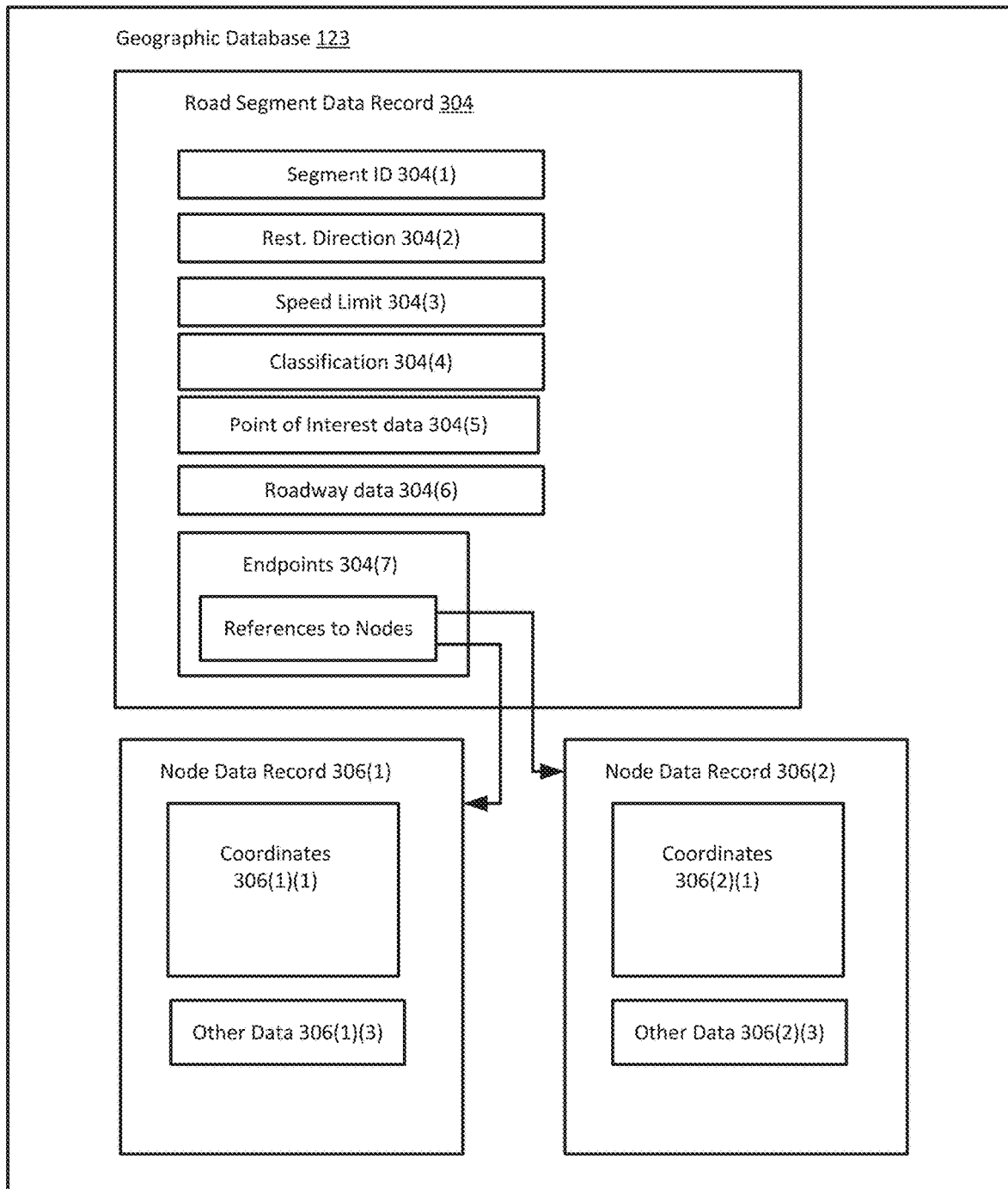
FIG. 10 depicts an example structure of the geographic database.

FIG. 10 shows some of the components of a road segment data record 304 contained in the geographic database 123 according to one embodiment. The road segment data record 304 may include a segment ID 304(1) by which the data record can be identified in the geographic database 123. Each road segment data record 304 may have associated information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record 304 may include data 304(5) related to points of interest. The road segment data record 304 may include data 304(6) that describes lane configurations. The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment such as coordinate data for shape points, points of interest (POIs), signage, other parts of the road segment, etc. The various attributes associated with a road segment may be included in a single road segment record or may be included in more than one type of record which cross-references each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 10 also shows some of the components of a node data record 306 which may be contained in the geographic database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 10, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

The data in the geographic database 123 may be organized using a graph that specifies relationships between entities. A location graph is a graph that includes relationships between location objects in a variety of ways. Objects and their relationships may be described using a set of labels. Objects may be referred to as "nodes" of the location graph, where the nodes and relationships among nodes may have data attributes. The organization of the location graph may be defined by a data scheme that defines the structure of the data. The organization of the nodes and relationships may be stored in an ontology which defines a set of concepts where the focus is on the meaning and shared understanding. These descriptions permit mapping of concepts from one domain to another. The ontology is modeled in a formal knowledge representation language which supports inferencing and is readily available from both open-source and proprietary tools.

Referring back to FIG. 7, a lane level map matcher may select/match a road segment or link by identifying the segment closest to the latitude and longitude of the probe data point. The lane level map matcher may be provided by the server 125 or the device 122. The lane level map matcher determines a lane strand/lane location based on or more techniques. In one embodiment, the server 125 uses a lane level map matcher to map match at least one trajectory (e.g., corresponding to a vehicle) to a lane-level of the road segment. The trajectory may be map-matched to the respective map or geographic records (e.g., stored in the geographic database 123) via position or GPS data associations (such as using known or future map matching or geo-coding techniques) and more specifically, the trajectory may be map-matched to individual lanes (e.g., any of the travel lanes, shoulder lanes, restricted lanes, service lanes, etc.) of the roadways by matching the geographic coordinates (e.g., longitude and latitude) between the probe data, sensor data, or a combination thereof and the respective lanes of the road segment.

In one embodiment, because the location measurement error in the probe data, sensor data, or a combination thereof (e.g., GPS error) can be greater than a lane width (making lane level map matching a technical challenge), the server 125/map matcher may use a probabilistic approach or other equivalent approach to perform lane level map matching. For example, under a probabilistic approach, the server 125 uses the raw GPS probe positions (e.g., links+latitude (lat) and longitude (lon)) for each probe to create a layer of abstraction over a digital map. The server 125 uses the abstraction layer (<Link-ID>, <d-value>) to generate lane probabilities of probes based on their lateral position (lane distance (d-value)) within a road segment. In one embodiment, the generated lane probabilities form the emission probabilities of a statistical model (e.g., a Hidden Markov Model (HMM)) that the server 125 may use to make an inference of the actual most probable lane(s) a probe trajectory traversed (e.g., one or more lanes of a multi-lane road). In one instance, the server 125 may use a dynamic programming algorithm (e.g., the Viterbi algorithm) to make this inference.

At Act A130, the server 125 generates one or more clusters of vehicles comprising one or more vehicles on a same lane of the one or more lanes within a threshold distance of other vehicles in a respective cluster. Clustering is used to partition data into groups, or clusters. A cluster may be defined as a group of data objects that are more similar to other objects in their cluster than they are to data objects in other clusters. Partitional clustering divides data objects into nonoverlapping groups. In other words, no object can be a member of more than one cluster, and every cluster must have at least one object. In an example, a vehicle on the road strand may only be part of one cluster. Clustering may use an iterative process to assign subsets of data points into k clusters. Two examples of partitional clustering algorithms are k-means and k-medoids. In an embodiment, the server 125 uses a k-means clustering method. The k-means clustering method is an unsupervised machine learning technique used to identify clusters of data objects in a dataset. The server 125 randomly select K centroids, where K is equal to the number of clusters the server 125 expects. Centroids are data points representing the center of a cluster. The server 125 then performs expectation-maximization. The expectation step assigns each data point to its nearest centroid. Then, the maximization step computes the mean of all the points for each cluster and sets the new centroid. The quality of the cluster assignments is determined by computing the sum of the squared error (SSE) after the centroids converge or match the previous iteration's assignment. The SSE is defined as the sum of the squared Euclidean distances of each point to its closest centroid. Since this is a measure of error, the objective of k-means is to try to minimize this value. In an embodiment, the server 125 performs K-means clustering with K-value=5 and a distance metric (x, y) where x=distance along the strand and y=probe speed. The x-value in the center of each K clusters is used sort them in sequential order. Alternative clustering methods may be used. The output of the clustering step is a set of clusters of vehicles that share some common denominator, for example grouped together.

At Act A140, the server 125 determines a speed metric for each cluster of the one or more clusters. In an embodiment, the speed metric is the average speed of the vehicles in a respective cluster. The speed metric may be calculated as an average or may be weighted or adjusted based on other characteristics of the vehicles or roadway.

At Act A150, the server 125 identifies unplanned incident locations based on differences in average speeds between contiguous clusters of the one or more clusters. In an embodiment, the server 125 calculates a speed-ratio SR for each contiguous pare of cluster using SR=(Avg.Speed of k+1)/(Avg.Speed of k) and obtains a level of service (LOS) delta (LD) or change in JAM factor across K clusters using LD=JAM.Factor of k+1−JAM.Factor of k. IF SR and/or LD values are greater than predefined thresholds, then a cluster k*=k is deemed to exhibit a traffic incident. The y-value in center of k* may be determined as a point of incident occurrence and the range min(Y) to max(Y) in k* is the subsegment. In an embodiment, all LS with at least one k* are identified and spatially interpolated to show the full lane-level detail of the impact of the incident if any.

The unplanned incident data may be published or provide through a service or application. The unplanned incident data may be used for navigation services, smart city analytics, incident management, DOT planning, autonomous driving, and/or dispatch of safety services from first responders among other uses. The larger difference of speeds across a lane may also help identify that some repair service is needed while the overall road condition remains passable.

In an example, a navigation device 122 may access the unplanned incident location data and perform one or more maneuvers or generate an alert in response. The alert may be used to be aware of such incidents. In an example, when the vehicle is approaching an unplanned incident location, the device 122 might prompt the user to take over the control of the vehicle. The controller 900 may reduce speed or behaviors in such areas.

The alert may be, for example a routing instruction to take a different route. The routing instructions may be provided by display 914. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

In response to the alert, a vehicle or driver may decide to take a different route. Vehicles in both directions may be informed of the increased risk for a specific time period. Pedestrians may be informed about the unplanned incident. Police/assistance may be notified to come and support the incident. The controller 900 may also include a routing module including an application specific module or processor that calculates routing between an origin and destination. The routing module is an example means for generating a route. The display 914 is an example means for displaying the routing command. The mobile device 122 may generate a routing instruction based on the anonymized data. The routing instructions may be provided by the display 914. The mobile device 122 may be configured to execute routing algorithms to determine an optimum route to travel along a road network from an origin location to a destination location in a geographic region. Using input(s) including map matching values from the mapping system 121, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on.

The results obtained by the server 125 may map an incident area on a strand with lane-level detail by showing sub-segments that are likely having a bottleneck or hazard and their corresponding traffic impact.

Figure 11:
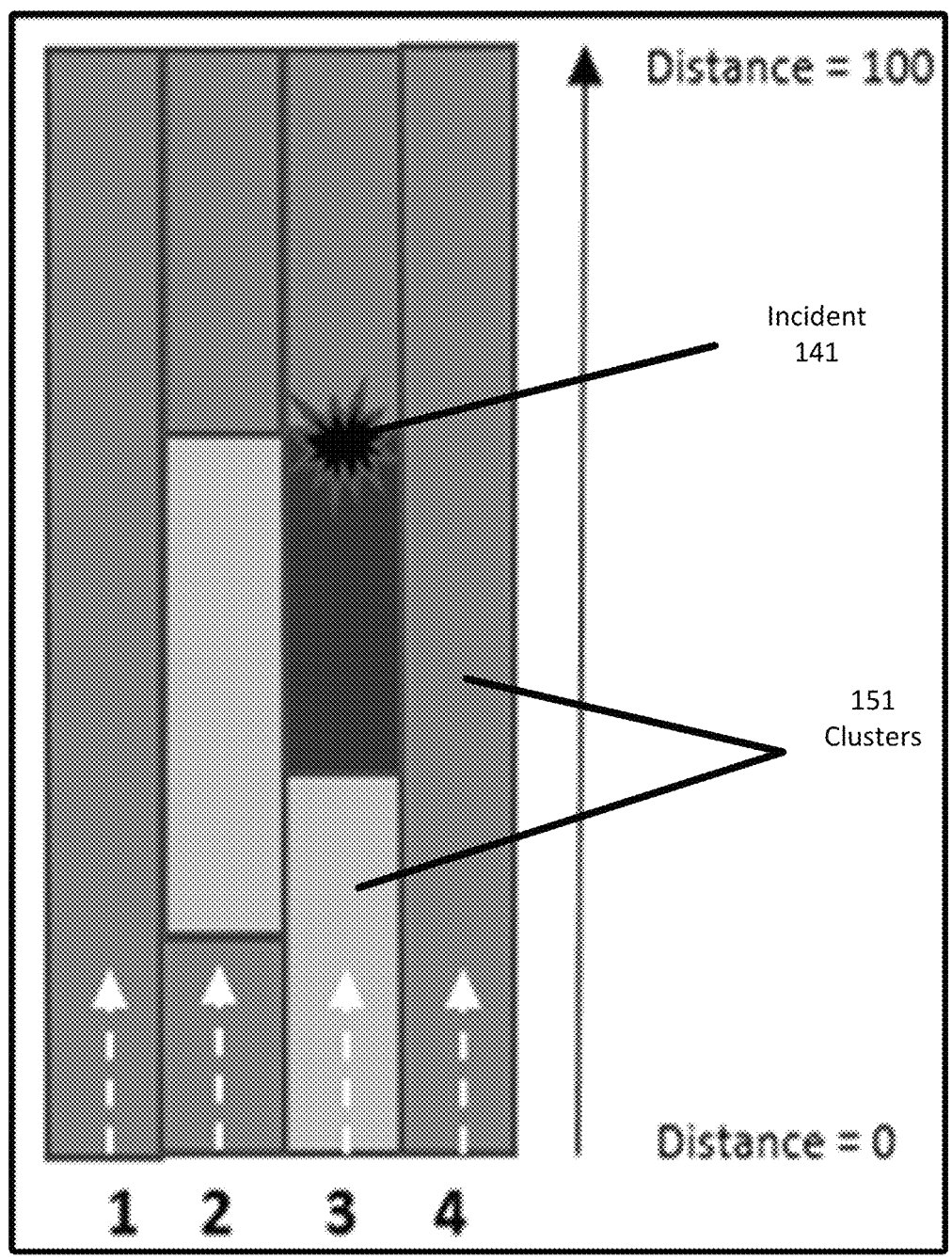
FIG. 11 depicts an example view of an unplanned incident according to an embodiment.

FIG. 11 depicts an example of a display map of a road strand. FIG. 11 depicts four lanes, 1-4. The road strand goes from distance 0 to distance 100. As depicted, there are eight clusters, five of which are traveling at an expected speed. The cluster right before the incident 141 has slowed down as do two adjacent clusters. The incident 141 may be identified by the mapping system 121 in real time using the average speed of each of the clusters. The average speed may also be published to generate a map as depicted. Individual devices 122 may generate their own navigation instructions based on the pattern of speed metrics for the clusters.

A user may interact with the map/navigation system/alert using an input device 916. The input device 916 may be one or more buttons, keypad, keyboard, mouse, stylus pen, trackball, rocker switch, touch pad, voice recognition circuit, or other device or component for inputting data to the mobile device 122. The input device 916 and display 914 may be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

Figure 12:
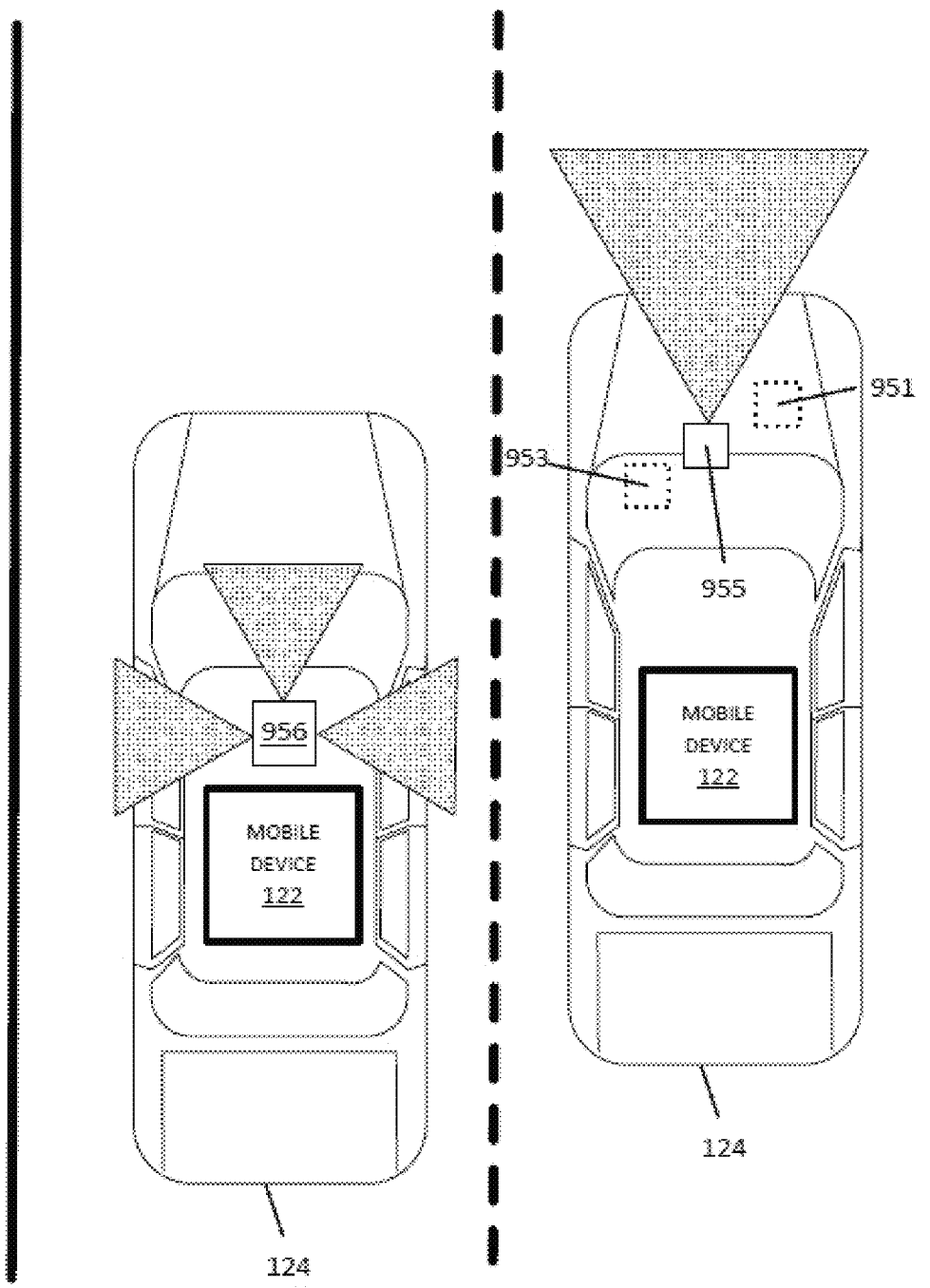
FIG. 12 depicts an example autonomous vehicle according to an embodiment.

In an embodiment, the device 122 may alert or otherwise provide instructions for an autonomous vehicle to perform a maneuver. FIG. 12 illustrates an exemplary vehicle 124 for providing location-based services, navigation services, or applications using the systems and methods described herein as well as collecting data for such services or applications described herein. The vehicles 124 may include a variety of devices that collect position data as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively, or additionally, the one or more detectors or sensors may include an accelerometer built or embedded into or within the interior of the vehicle 124. The vehicle 124 may include one or more distance data detection device or sensor, such as a LIDAR device. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server 125. The network may be the Internet or connected to the internet.

The sensor array may include one or more sensors configured to detect surroundings of the vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the lane marking indicators (lane marking type, lane marking intensity, lane marking color, lane marking offset, lane marking width, or other characteristics) received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) received from geographic database 123 and the server 125 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) received from geographic database 123 and the server 125 and driving commands or navigation commands.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method for detecting and obtaining lane-level insight in unplanned incidents, the method comprising:
   acquiring, from a plurality of probe vehicles, probe data for a road strand comprising a plurality of lanes;
   map matching, using a lane level map matcher, the probe data;
   splitting the road strand into a plurality of lane strands;
   generating, using a clustering algorithm and the map matched probe data, three or more clusters of vehicles each comprising one or more probe vehicles on a same lane strand of the plurality of lane strands within a threshold distance of other probe vehicles in a respective cluster, wherein at least two of the three or more clusters of vehicles are located on different lane strands of the plurality of lane strands;
   determining an average speed for each cluster of the three or more clusters;
   sorting each of the three of more clusters in a sequential order using an x-value in a center of each of the three or more cluster;
   calculating a speed-ratio for each contiguous pair of clusters of the three or more clusters where the speed-ratio=(average speed of a first cluster and a next sequential cluster)/(average speed of the first cluster);
   computing a JAM factor for each of the three or more clusters, wherein the JAM factor comprises a speed-ratio of the average speed vs a free flow speed of the road strand;
   calculating a LOS delta value or a change in a JAM factor across K clusters of the three or more clusters using LOS delta value=JAM.Factor of k+1−JAM.Factor of k, wherein if the LOS delta value is greater than a predefined threshold, then a cluster k is determined to have an unplanned traffic incident.

2. The method of claim 1, wherein the probe data comprises at least a latitude and longitude value.

3. The method of claim 1, wherein map matching comprises:
   matching positional coordinates for respective probe data against lane-based probabilities for historical probe data.

4. The method of claim 1, wherein the clustering algorithm comprises a k-means clustering algorithm.

5. The method of claim 4, wherein a distance metric for the k-means clustering algorithm is a composite of a probe vehicle's distance along the road strand and a speed.

6. The method of claim 1, further comprising:
   receiving a request for a route from a navigation device;
   generating the route based at least in part on the identified unplanned incident locations; and
   transmitting the route to the navigation device.

7. The method of claim 1, wherein the unplanned incident comprises at least one of a traffic accident, a slow vehicle, or a roadway obstruction.

8. An intelligent transportation system for detecting and obtaining lane-level insight in unplanned incidents, the system comprising:
   one or more probe devices configured to acquire probe data for a road strand comprising a plurality of lanes strands;
   a geographic database configured to store map data relating to the road strand; and
   a mapping server configured to map match, using a lane level map matcher and the map data, the probe data, generate, using a clustering algorithm and the map matched probe data, three or more clusters of vehicles each comprising one or more probe vehicles on a same lane strand of the plurality of lanes strand within a threshold distance of other probe vehicles in a respective cluster, wherein at least two of the three or more clusters of vehicles are located on different lane strands of the plurality of lane strands, determine an average speed for each cluster of the three or more clusters, calculate a speed-ratio for each contiguous pair of clusters of the three or more clusters where the speed-ratio=(average speed of k+1)/(average speed of k), and calculate a LOS delta value or a change in a JAM factor across K clusters of the three or more clusters using LOS delta value=JAM.Factor of k+1−JAM.Factor of k, wherein if the LOS delta value and speed-ratio is greater than respective predefined threshold, then a cluster k is determined to have an unplanned traffic incident.

9. The intelligent transportation system of claim 8, wherein the probe data comprises at least a latitude and longitude value.

10. The intelligent transportation system of claim 8, wherein the mapping server is configured to map match the probe data by matching positional coordinates for respective probe data against lane-based probabilities for historical probe data.

11. The intelligent transportation system of claim 8, wherein the clustering algorithm comprises a k-means clustering algorithm.

12. The intelligent transportation system of claim 11, wherein a distance metric for the k-means clustering algorithm is a composite of a probe vehicle's distance along the road strand and a speed.

13. The intelligent transportation system of claim 8, wherein the mapping server is further configured to publish the unplanned incident locations for use by navigation devices in making routing decisions.

14. An apparatus comprising:
- at least one processor; and
- at least one memory including computer program code for one or more programs; the at least one memory configured to store the computer program code configured to, with the at least one processor, cause the at least one processor to:
- acquire, from a plurality of probe vehicles, probe data for a road strand comprising two or more lanes;
- map match, using a lane level map matcher, the probe data;
- split the road strand into a plurality of lane strands;
- generate, using a clustering algorithm and the map matched probe data, three or more clusters of vehicles each comprising one or more probe vehicles on a same lane of the one or more lanes within a threshold distance of other probe vehicles in a respective cluster, wherein at least two of the three or more clusters of vehicles are located on different lane strands of the plurality of lane strands;
- determine an average speed for each cluster of the three or more clusters;
- calculate a speed-ratio for each contiguous pair of clusters of the three or more clusters where the speed-ratio= (average speed of k+1)/(average speed of k); and
- calculate a LOS delta value or a change in a JAM factor across K clusters of the three or more clusters using LOS delta value=JAM.Factor of k+1−JAM.Factor of k, wherein if the LOS delta value and speed-ratio is greater than respective predefined threshold, then a cluster k is determined to have an unplanned traffic incident.

15. The apparatus of claim 14, wherein the clustering algorithm comprises a k-means clustering algorithm.

\* \* \* \* \*